Figure 4:
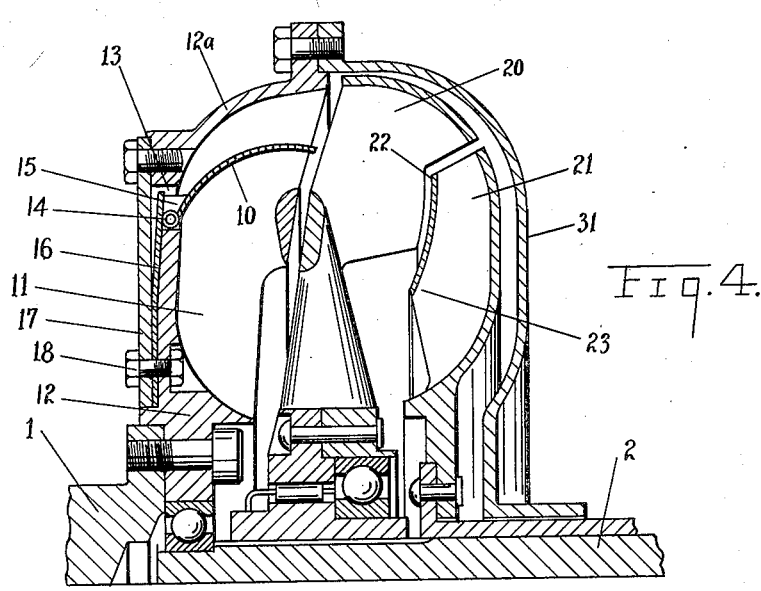

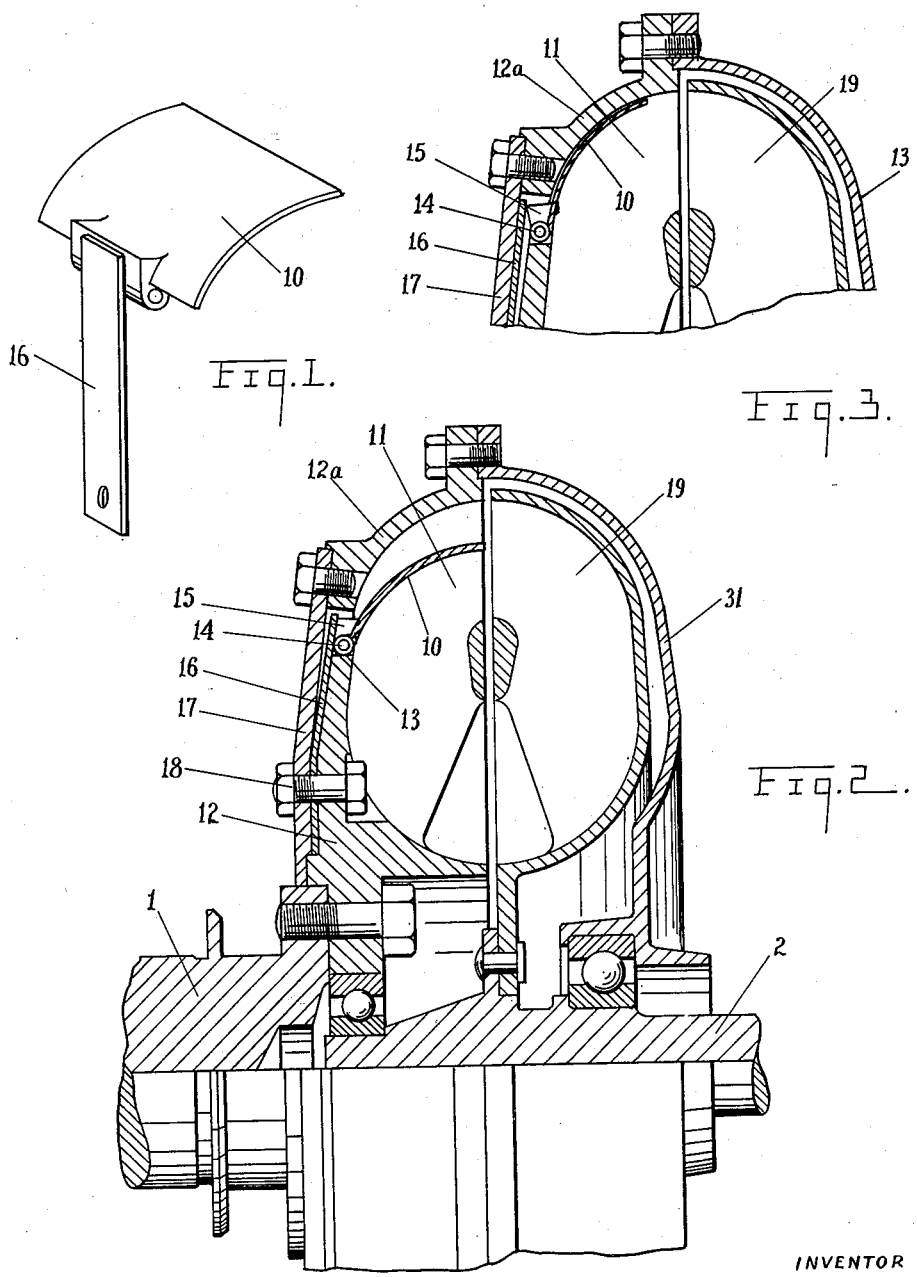

Jan. 2, 1951 W. A. DUFFIELD 2,536,842
ROTARY TURBINE TYPE FLUID COUPLING
Filed May 4, 1946 2 Sheets-Sheet 2

INVENTOR
William A. Duffield.
By
Robert Duncan
AGENT

Patented Jan. 2, 1951

2,536,842

UNITED STATES PATENT OFFICE 2,536,842

ROTARY TURBINE TYPE FLUID COUPLING

William A. Duffield, Windsor, Ontario, Canada

Application May 4, 1946, Serial No. 667,426
In Canada January 24, 1946

4 Claims. (Cl. 60—54)

This invention relates to fluid couplings and particularly to means for improving the efficiency of couplings during the period of starting-up.

Heretofore fluid couplings have had to be designed to give maximum efficiency on a compromise basis, keeping in mind the fact that a coupling large enough to give a satisfactory slip percentage at reasonable speeds, does not permit sufficient slip when starting the load. This condition is a great disadvantage when used with internal combustion engines because the engine cannot approach its torque peak before it is fully loaded.

By the use of the invention hereinafter described, the effective diameter, of either a single stage or multi-stage fluid coupling, is varied in accordance with the R. P. M. of the driver element of the coupling, and can be so arranged that no increase in effective diameter takes place until a predetermined value of R. P. M. has been reached. This variation of the effective diameter takes place automatically and required no controlling mechanism.

The objects of the invention are to provide a variable diameter fluid coupling, the variation being controlled automatically by centrifugal force as the speed of the prime mover or input shaft is increased.

A further object is to provide automatic means whereby the second stage runner or runners of a fluid coupling are short circuited at low speeds thereby concentrating the full high torque load against the first stage runner for starting up purposes.

A further object is to provide a simple device which will not interfere with the functioning of the coupling at high speeds, without added controls or increased cost.

Reference is made to the drawings in which Figure 1 is a perspective view of the essential parts of the invention.

Figure 2 is a half section of a single stage coupling showing the device installed and in the "at rest" position.

Figure 3 is a partial view similar to Figure 2 but showing the device at "full diameter" when acted upon by centrifugal force at maximum R. P. M.

Figure 4 is a view similar to that shown in Figure 2 except that the device is shown as applied to a two stage fluid coupling.

Referring particularly to Figures 1, 2 and 3 of the drawings in which the device and its application to a simple fluid clutch is shown, the shaft 1 is the input shaft, and the shaft 2 is the output shaft. The blades 10 are mounted between the vanes 11 of the driver element 12 or impeller of the coupling. The blades 10 are provided with a pivot block 15 which also acts as an abutment against which the leaf spring 16 presses to hold the blades inwardly at a reduced radius in respect to the outer diameter of the driver element 12.

The driver element 12 is provided with recesses 13 to receive the pivot block 15 of the blades 10. Pivot pins 14 hold the blades 10 in their proper relationship to the vanes 11 of the driver element.

The leaf spring 16 is anchored to the driver element 12 by means of the bolt 18 and is preset to exert a predetermined pressure upon the block 15 in order to hold the blade 10 against outward movement, under the action of centrifugal force at low R. P. M. The blades 10 are shaped to conform to the outer contour 12a of the driver element 12 and take up a position against this surface, as shown in Figure 3 of the drawings, when centrifugal force is great enough to overcome the pressure exerted upon the blades 10 by the spring 16.

A cover plate 17 encloses the springs 16 while at the same time anchoring the two portions 12 and 12a of the driver element together.

In Figure 4 of the drawings, a fluid coupling of the two stage type is shown, having a driver element 12, similar to that shown in Figure 2, and having a first stage runner element 20 and a second stage runner element 21. The blades 10 in this combination are identical with and are anchored in the same manner as those shown in Figures 2 and 3. The ends of the blades 10, when the driver element 12 is at rest, or running at low speed, is directed to the exposed end 22 of the inner wall 23 of the second stage runner 21. The blades 10, in this position, act as deflectors directing the flow of fluid into the first stage runner 20 and away from the second stage runner 21. It is only as the driver element 12 attains high speed and centrifugal force acts on the blades 10, moving them outwardly, that fluid can flow into the second stage runner 21.

In all of the above described forms, an outer casing 31 encloses the unit against loss of fluid.

It will be noted that in each of the forms described, the effective diameter of the coupling is reduced when the unit is at rest or running at low speed and, in the case of the multi-stage units, the second stage runner is short circuited.

In the operation of this invention the effective diameter of the coupling is varied automatically by the action of centrifugal force dependent on the speed developed by the driver element or impeller of the fluid coupling, as in Figures 2, 3 and 4 of the drawings.

In the forms illustrated in which the pivoted type of blade is shown, the effective diameter of the coupling is that at which the blade is held by the backing spring 16. During the period of starting up, the blades 10 give a small effective diameter of coupling, therefore, the application of a high torque load against the smaller diameter will allow the driver element 12 to attain a higher value of R. P. M. before reaching the stall point, than would be possible if the maximum diameter of coupling were exposed to the action of the fluid.

When centrifugal force, due to the high speed of the driver element 12, acts on the blades 10, they are caused to move outwardly at a radius about the pivots 14, gradually increasing the effective diameter of the coupling until such time as maximum R. P. M. for which the unit is designed, is reached. At this point the blades 10 are backed against the wall of the driver element 12 at 12a, and present no interference with the flow of the fluid at the maximum effective diameter of the coupling.

The same action takes place in the case of the coupling illustrated in Figure 4, with the additional feature that at low speed, the fluid is diverted into the first stage runner and away from the second stage runner, thereby concentrating the fluid to a small effective diameter and to the first stage runner. As the speed increases, not only is the effective diameter increased but fluid is allowed to gradually enter the second stage runner until at maximum R. P. M. the second stage runner is fully exposed to the flow of fluid.

After the unit has been running at high speed with the full effective diameter of the coupling exposed to the action of the fluid, the reverse of the above described action can take place. This reverse action can take place due to (a) increased load on the output side of the clutch causing a retardation on the flow of fluid or (b) throttling of the prime mover causing a reduction in the speed of the driver element of the clutch. The variation of effective diameter of the clutch is completely automatic and the changes take place immediately, up or down, in agreement with the speed of the driving element or the load on the output shaft.

It will therefore be seen that this device adds little or no complication to the construction of fluid clutches, does not interfere with the normal operation, is fully automatic and allows the clutch to function at greatest efficiency from zero to maximum speed.

What I claim is:

1. In a fluid coupling comprising a casing vaned to form a driver element and having runner elements within the casing, individual blades pivoted in the casing wall between the vanes of the driver element, said blades being curved substantially as the curvature of the casing towards its outer diameter, springs backing said blades adapted to hold the blades away from the wall of the casing when the coupling is rotating at low speed to reduce the effective diameter of the driver element with respect to the normal diameter of the fluid coupling.

2. In a fluid coupling comprising a casing vaned to form a driver element and having runner elements within the casing, individual blades having an offset pivot block adapted to be pivoted within the casing wall between the vanes of the driver element, said blades being curved substantially as the curvature of the casing towards its outer diameter, and springs backing said blades adapted to hold the blades away from the wall of the casing when the coupling is rotating at low speed to reduce the effective diameter of the driver element with respect to the normal diameter of the fluid coupling.

3. In a fluid coupling comprising a casing vaned in one half to form a driver element and having runner elements within the casing facing the vaned driver element, individual blades having an offset pivot block adapted to be pivoted within the casing wall between the vanes of the driver element, said blades being curved substantially as the curvature of the casing towards its outer diameter and presenting a continuously smooth surface with the wall of the casing towards the edges of the vanes of the driver element, springs backing said blades adapted to hold the blades away from the wall of the casing when the coupling is rotating at low speed to reduce the effective diameter of the driver element with respect to the normal diameter of the fluid coupling.

4. In a fluid coupling comprising a casing vaned in one half to form a driver element and having runner elements within the casing facing the vaned driver element, said casing having openings in its wall between the vanes situated radially at a point where the side wall starts to curve towards the outer diameter of the casing, a cover to the casing closing off said openings and providing a limited space between it and the casing radially inwardly toward the axis, individual blades pivotally mounted within the openings in the casing one to each space between the blades, said blades being curved substantially as the curvature of the casing towards its outer diameter and presenting a continuously smooth surface with the wall of the casing towards the edges of the vanes of the driver element, springs mounted between said casing and cover backing said curved blades and adapted to hold the blades away from the wall of the casing when the coupling is rotating at low speed to reduce the effective diameter of the driver element with respect to the normal diameter of the fluid coupling.

WILLIAM A. DUFFIELD.

REFERENCES CITED

The following references are of record in the file of this patent:

UNITED STATES PATENTS

| Number | Name | Date |
|---|---|---|
| 2,096,070 | Sinclair | Oct. 19, 1937 |
| 2,267,476 | Patterson | Dec. 23, 1941 |
| 2,356,125 | Swift | Aug. 22, 1944 |
| 2,358,473 | Patterson | Sept. 19, 1944 |
| 2,367,364 | Miller | Jan. 16, 1945 |

FOREIGN PATENTS

| Number | Country | Date |
|---|---|---|
| 548,044 | Great Britain | Sept. 23, 1942 |